United States Patent [19]

Hamel et al.

[11] E Re. 28,853

[45] Reissued June 8, 1976

[54] SUPERCONDUCTIVE SHIFT REGISTER UTILIZING JOSEPHSON TUNNELLING DEVICES

[75] Inventors: Harvey C. Hamel; Charles A. Kunzinger; William K. Stelzenmuller, all of Poughkeepsie, N.Y.

[73] Assignee: International Business Machines Corporation, Armonk, N.Y.

[22] Filed: June 16, 1975

[21] Appl. No.: 587,458

Related U.S. Patent Documents

Reissue of:

[64] Patent No.: 3,825,906
Issued: July 23, 1974
Appl. No.: 375,236
Filed: June 29, 1973

[52] U.S. Cl. ..... 340/173.1; 307/306
[51] Int. Cl.[2] ..... G11C 11/44
[58] Field of Search ..... 340/173.1; 307/306

[56] References Cited

UNITED STATES PATENTS

| | | | |
|---|---|---|---|
| 3,281,609 | 10/1966 | Rowell | 340/173.1 |
| 3,626,391 | 12/1971 | Anaker | 340/173.1 |

*Primary Examiner*—Terrell W. Fears
*Attorney, Agent, or Firm*—Harold H. Sweeney, Jr.

[57] ABSTRACT

A [ two-phase ] superconductive shift register using Josephson tunnelling devices is provided wherein a plurality of shift register stages each includes a first and second branch in parallel to which a DC current is supplied. A Josephson tunnelling device is located in each branch which operates in its no voltage state when the DC current is applied thereto. A first and second input means is provided for switching one of the Josephson tunnelling devices in accordance with an input to cause the input current to flow through the other branch. A first and second [ coupling ] *control* means are located between the stages of the shift register, the first [ coupling ] *control* means coupling the first branch circuits of successive stages and the second [ coupling ] *control* means coupling second branch circuits of successive stages. The [ coupling ] *control* means are [ energized ] *effective* in response to phase time pulses and current flow in the preceding stage causing the Josephson device in the next stage to switch to its finite voltage stage thereby causing the current to flow in the opposite branch in the next stage.

11 Claims, 3 Drawing Figures

SUPERCONDUCTIVE SHIFT REGISTER UTILIZING JOSEPHSON TUNNELLING DEVICES

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a circuit using Josephson tunnelling devices and more particularly, to a superconductive shift register circuit which requires no sustaining power for operation.

2. Description of the Prior Art

Josephson tunnelling devices are superconductive elements exhibiting a zero voltage current stage in which pair tunnelling exists, and a finite voltage state in which single particle tunnelling exists. The existence of a zero voltage state in a superconductive tunnel junction was first described in July, 1962 by B. D. Josephson. Since that time, these devices have been proposed for applications in memory and logic. For instance, U.S. Pat. No. 3,626,391 describes a superconductive memory using Josephson tunnelling devices in which memory cells comprised of superconducting loops are used. Josephson junctions determine the direction of current flow in the superconducting loops and they are also used for sensing the current in these loops.

U.S. Pat. No. 3,281,609 describes a logic device using Josephson tunnelling junctions in which the magnetic fields applied to the junction cause the junction to switch voltage states, depending upon whether or not the maximum zero voltage current through the junction is exceeded. Externally applied magnetic fields are used to lower the threshold current (maximum zero voltage current) of the tunnel junction so that switching to a finite voltage state occurs.

U.S. Pat. application, filed June 30, 1972, Ser. No. 267,841, now U.S. Pat. No. 3,758,795, describes a superconductive circuit using a Josephson tunnelling device connected to a transmission line having a termination such that reflections do not result when the Josephson tunnelling device switches between two stable voltage states, in accordance with applied input signals.

Josephson tunnelling junctions have been applied to various logic circuits. However, they have not been utilized in a shift register circuit which is capable of providing shifting without the necessity of any standby power to sustain operation. In other words, each of the stages is in the superconductive current state in which there is no voltage regardless of whether the stage is in the so-called "1" or "0" state. The register shifting can be stopped at the completion of any phase time and substained in that condition with no standby power dissipation. To reinitiate shifting, it is only necessary to bring in the next phase clock.

Although applications for Josephson tunnelling junctions are known in the prior art, the prior art does not show how to obtain a reliable shift register circuit, especially one that can be implemented using very few Josephson devices and which requires a minimum of power.

Accordingly, it is a main object of the present invention to provide a shift register circuit utilizing Josephson tunnelling devices in which the power dissipation is minimized.

It is another object of the present invention to provide a shift register circuit using Josephson tunnelling devices in which the operation can be obtained in a two-phase timing sequence.

It is still another object of the invention to provide a shift register circuit using Josephson tunnelling devices which is capable of extremely high speed switching.

It is a further object of the invention to provide shift register circuits using Josephson tunnelling devices in which the various stages have the same current supply source.

It is a still further object of the invention to provide Josephson tunnelling device circuits which can be easily fabricated using conventional planar technology.

BRIEF SUMMARY OF THE INVENTION

A [ two-phase ] superconductive shift register is provided using Josephson tunnelling devices which includes a plurality of shift register stages energized from a DC current source. Each stage includes a first and second branch circuit in parallel. A Josephson tunnelling device is located in each of the branches. The Josephson device in each branch operates in the no-voltage stage when the DC current is applied thereto. A first and second input means provides an input for selecting one of the Josephson devices thus causing the input current to flow through the other branch. A first and second [ coupling ] *control* means are located between the first and second branches of the shift register stages, respectively. The [ coupling ] *control* means are activated by phase time pulses which apply a current pulse at the [ opposite ] *appropriate* phase time with respect to adjacent stages of the register. The first and second [ coupling ] *control* means [ respond ] *are effective in response* to both the preceding stage branch circuits in which the current flows and the phase time pulses *to* cause the current to flow in the opposite branch in the succeeding stage.

DETAILED DESCRIPTION OF THE PREFERRED EMBODIMENTS

Figure 1:
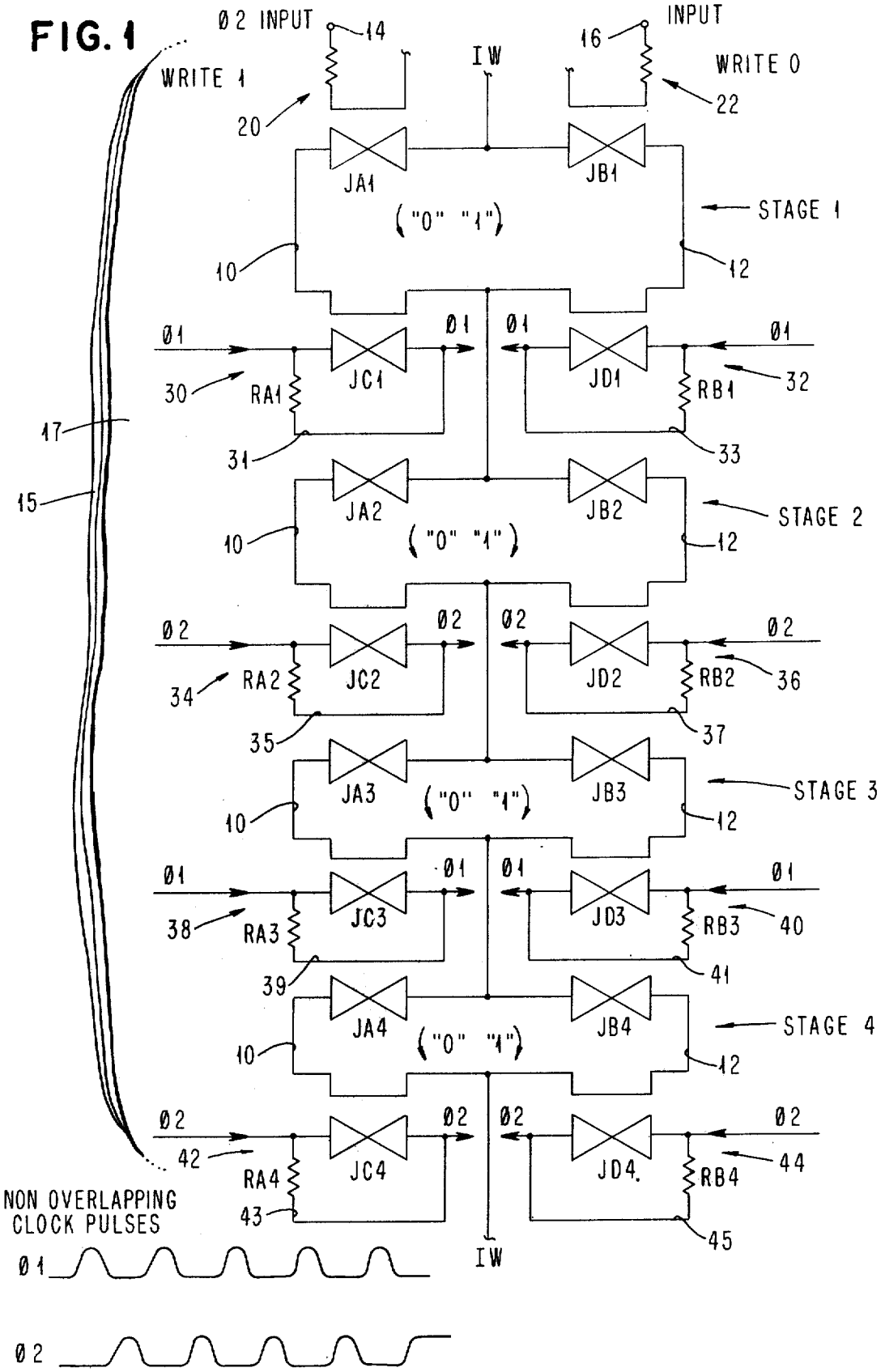
FIG. 1 is a schematic illustration of a superconductive shift register circuit utilizing Josephson tunnelling devices.

FIG. 1 is a schematic diagram of a superconductive shift register circuit utilizing Josephson tunnelling junctions in a two-phase timing sequence to provide a high speed, low power device.

In more detail, the superconductive shift register circuit consists of four stages 1, 2, 3 and 4 each having a first and second parallel branch 10 and 12 with respect to input current Iw. Of course, the number of stages is theoretically unlimited. In the state where there is no input to any of the shift register stages, the current will tend to split into the two parallel branches 10 and 12 of each of the stages. Josephson devices JA1, JA2, JA3 and JA4 are located in the respective branches 10 of the stages 1, 2, 3 and 4, respectively, and Josephson devices JB1, JB2, JB3 and JB4 are located in the respective branches 12 of the stages 1, 2, 3, and 4, respectively. The stages present no resistance since the current applied thereto is well below the critical current value at which the Josephson device switches from its no voltage to its finite voltage state. Once an input 14 or 16 is provided at the first stage of the shift register, one of the Josephson devices JA1, JB1 will be switched. For example, the write "1" input would be applied to the lefthand input control circuit 20 which causes the Josephson junction JA1 to switch to its finite voltage state. The input is a current pulse which in flowing through circuit 20 or 22 gives rise to magnetic fields which couple to the Josephson device JA1 or JB1 lowering the maximum no voltage current value at which the device switches. When one of the Josephson devices JA1, JB1 switches into its finite voltage state by an input 14,16 on one of the input circuits 20,22; the current will no longer split through each branch 10,12 but will flow through the opposite branch to the Josephson device at which the input is received. In other words, the Josephson devices JA1, JB1 which switches into its finite voltage state has sufficient resistance to cause the current to flow through the opposite branch of the circuit which is still in its no voltage state and accordingly, has no resistance. It has arbitrarily been selected, that the flow through the right hand branch 12 of any stage will represent a "1" storage while the current flow through the lefthand branch 10 will represent the "0" storage. Accordingly, a 0 input at the input 16 shown on the right affects the Josephson junction JB1 so that it switches into its finite voltage state thereby causing the current to flow in the left hand or "0" branch 10 of the stage.

A first and second coupling means 30,32 are located between the first and second stages of the shift register. The coupling means 30 couples between the first branches 10 of the first and second stages while the coupling means 32 couples between the second branches 12 of the first and second stages. Each of the coupling means 30,32 includes a Josephson tunnelling junction JC1, JD1, respectively. Bypass circuits 31,33 are connected across the Josephson devices JC1, JD1, respectively, in each of the coupling means. Likewise, a first and second coupling means 34,36 are located between the second and third stages of the shift register coupling between the first branches 10 and second branches 12, respectively. Each coupling means 34,36 includes a Josephson tunnelling junction JC2, JD2, respectively. Bypass circuits 35 and 37 are connected across the Josephson junctions JC2 and JD2, respectively. Each of these bypass circuits include terminating resistance RA2 and RB2, respectively. Further, first and second coupling means 38,40 including Josephson tunnelling devices JC3 and JD3, respectively, are located between the third and fourth stages of the register. Bypass circuits 39 and 41 are connected across the tunnelling junctions JC3 and JD3, respectively. Each of these bypass circuits includes a terminating resistance RA3 and RB3, respectively. A first and second coupling means 42, 44 including Josephson tunnelling junctions JC4 and JD4 are shown as the output means from stage 4 of the shift register illustrated in FIG. 1. Bypass circuits 43 and 45 are connected across these junctions JC4 and JD4, respectively. Each of these bypass circuits include a terminating resistance RA4 and RB4, respectively.

The operation of the shift register can be appreciated from the following example wherein an input 14 is applied to the input circuit 20 which serves as the control means for Josephson tunnelling junction JA1. The input to this input circuit 20 is selected as the write "1" input. The input 14 is a current pulse which in passing through the input circuit 20 causes a magnetic field which couples to the Josephson junction JA1 lowering the maximum 0 voltage current below the input current value Iw causing the Josephson device JA1 to switch to its finite voltage state. When the Josephson junction JA1 switches to its finite voltage state the input current Iw will pass through the path of least resistance, path 12. Thus, the flow of the input current Iw through the branch 12 will represent the "1" condition of stage 1.

Similarly, if an input had been applied at the input circuit 22 the Josephson junction JB1 would have switched and the input current flow Iw would be through the branch 10 representing the "0" condition of the stage. The current flow through the branch 12 acts as a control means for the adjacent Josephson junction JD1 of the coupling means 32. The current flow in the branch 12 sets up a magnetic field which couples to Josephson device JD1 lowering the maximum no voltage current value. At $\phi 1$ time a current pulse is applied to the Josephson junction JD1, the current value of which is above the maximum no voltage current value so that the Josephson device JD1 switches into its finite voltage state. When the device JD1 switches into its finite voltage state, the current passes through the bypass circuit 33. The current passing through the bypass circuit 33 sets up a magnetic field which couples to the adjacent Josephson tunnelling junction JB2 in the second stage of the shift register. This coupling of the magnetic field lowers the threshold current value similar to the operation in connection with Josephson device JA1. Thus, the Josephson device JB2 switches into its finite voltage state and the input current Iw to the second stage of the shift register passes through the lefthand or branch 10 of the second stage. As has been previously mentioned, this represents the "0" state of the stage. This current through the branch 10 sets up a magnetic field which couples to the Josephson device JC2 lowering the threshold current similar to the operation in connection with Josephson device JD1. The Josephson device JC2 is switched into its finite voltage state upon the receipt of the $\phi 2$ current pulse. Once this junction has been placed in its finite voltage state, the $\phi 2$ current pulse will flow through the bypass circuit 35 which sets up a magnetic field which couples to the next Josephson junction JA3 in stage 3. This magnetic coupling causes the junction JA3 to switch, in the same manner as was previously described in connection with junction JA1, so that the current flow is through the path of least resistance, branch 12. This represents the "1" state of the stage. Similarly, the current flow in branch 12 of stage 3 causes Josephson device JD3 to switch to its finite voltage state and the $\phi 1$ current pulse applied thereto passes through the bypass circuit 41 causing the Josephson junction JB4 in stage 4 to switch to its finite voltage state thereby causing the current Iw to flow through the branch 10. Similarly, the flow of the current through branch 10 sets up a magnetic field causing coupling to Josephson junction JC4 which switches to its finite voltage state upon the receipt of the $\phi 2$ current pulse. The current pulse is bypassed through bypass circuit 43 which serves as the output of the shift register shown in FIG. 1. The resistance in each of the bypass circuits associated with each of the coupling means between the stages as well as in the input and output means prevent circulating currents in the circuits. It can be seen that the "0" input on the input circuit 22 produces current flow in the opposite branch of the respective stages.

It should be noted that the current is switched from branch to branch in the shift register and that the current flow is in opposite branches in succeeding stages. Therefore, the input pulse can be obtained as an output from the odd number stages. That is, if a "1" is written into the first stage as shown in FIG. 1, it can be obtained as an output "1" from the third, fifth, etc. stages. The other stages in this case, the second, fourth and so forth will provide an output but in an inverted state. The fact that some of the stages store the input as the opposite value is incidental since it is a matter of terminology only. In other words, it is only a matter of assigning the current flow in one of the branches a particular value such as "0" or "1".

It should be noted that the Iw current applied as an input to the first stage of the shift register is available to each succeeding stage of the shift register and is available at the output. This current Iw always passes through the branch circuit in which the Josephson device is in its "0" voltage state in each of the stages. Therefore, it is theoretically not reduced in amplitude because of the lack of resistance of the Josephson tunnelling devices in the "0" voltage state. If the input is to be stored in one of the shift register stages, the phase timing pulse for shifting it out or for coupling to the next stage is suppressed. Accordingly, the "0" or "1" current conduction in the respective branches will remain. It should be appreciated, that no power is being dissipated in this storage and thus the shifting can be again initiated by the application of the correct phase time pulse to the coupling means to the next stage. This no-power dissipation for sustaining a value in the shift register is an extremely important feature. Theoretically, an infinite number of stages can be utilized since the power consumption is theoretically "0".

Figure 2:
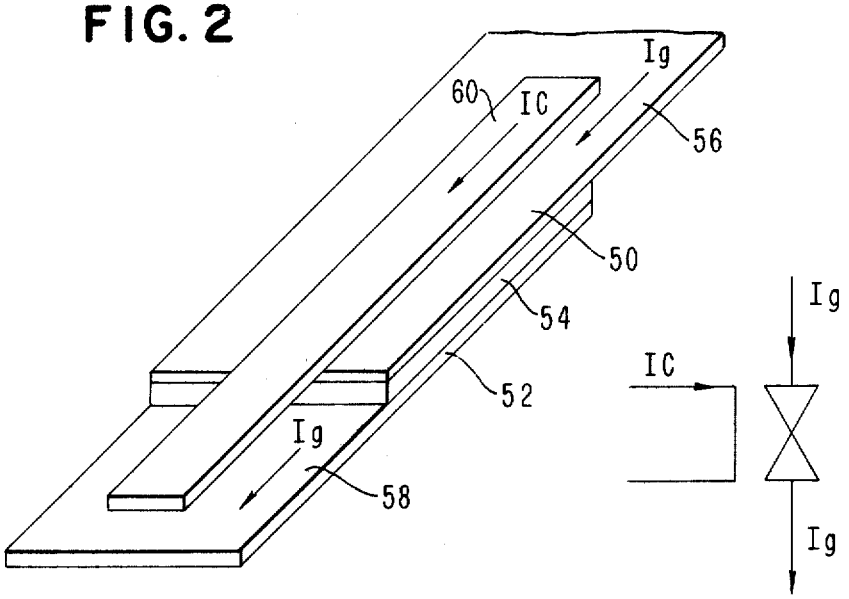
FIG. 2 is a diagram illustrating the structure of one of the Josephson tunnelling junctions of the shift register circuit shown schematically in FIG. 1.

FIG. 2 shows the structure of a typical one of the Josephson tunnelling devices utilized in FIG. 1. The symbolism is also shown in connection therewith. Each of the Josephson tunnelling devices are constructed similarly and are comprised of superconducting electrodes 50 and 52. These superconducting electrodes are separated by a tunnel barrier 54. The electrodes 50,52 are fabricated from known superconductive materials, such as lead or tin. Preferably, tunnel barrier 54 is an oxide of the base electrode and can be for instance, lead oxide. The manner of construction of a Josephson tunnelling junction is well understood in the art and will not be described further here.

The branch circuitry is comprised of superconductive striplines 56 and 58. As with the electrodes of the Josephson devices, the striplines are deposited by known processes such as evaporation or sputtering. In FIG. 1, the striplines are shown deposited on an insulative layer 17 which is located over superconductive ground plane 15. The control conductors 60 are generally superconductive lines although they need not be superconductive. If these control conductors are the output loops of other Josephson tunnelling circuits as is the case with respect to the coupling means, they will be superconductive lines. The control conductors 60 are shown in this figure as being located over the respective Josephson junctions. The symbolism used in FIG. 1, is shown specifically in FIG. 2 in conjunction with the Josephson device illustrated.

Figure 3:
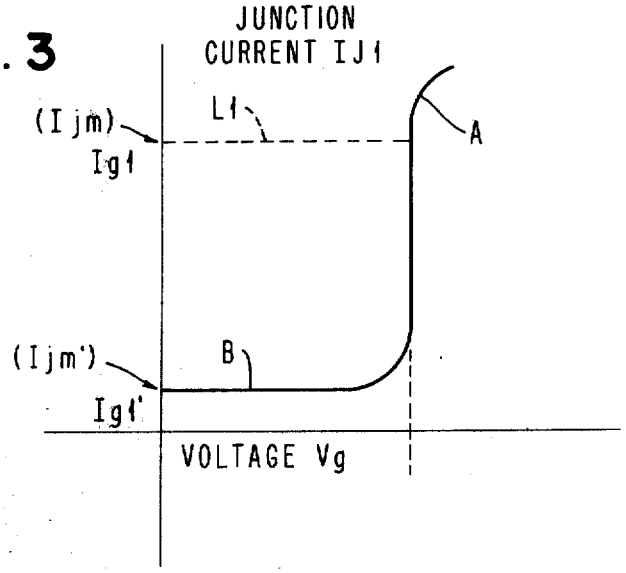
FIG. 3 is a plot of tunnel junction current versus tunnel junction voltage for a Josephson tunnelling junction, used to illustrate the operation of the circuit shown in FIG. 1.

FIG. 3 shows the plot of Josephson junction current IJ1 through a typical Josephson tunnel junction designated as J1, plotted as a function of the voltage across the junction. This plot shows the conventional curve denoting pair tunnelling through the junction in the "0" voltage state and single particle tunnelling through the junction in the finite voltage state. That is, currents up to a magnitude of IJm will flow through the junction in its "0" voltage state. When current IJ1 through the junction exceeds this value, the junction will rapidly switch to a finite voltage state at which time the voltage across the junction will be the gap voltage Vg. When current through the junction is decreased to a value less than IJm', the voltage across the junction will follow the curve, indicated by portions A and B, back to the "0" voltage state. The dotted line L1 will be used to explain the operation of the Josephson tunnel devices in the circuit of FIG. 1, when the device is switched in accordance with current applied to the control conductor. Assume that the junction J1 is in its "0" voltage state and a current IG1 flows through the device J1. If a sufficient magnetic field now couples to J1 such that the critical current IJm in J1 falls to a value less than IG1, tunnel device J1 will immediately switch to a finite voltage state. The current I in will immediately start flowing through the outer branch of the circuit, since the devine in this other branch offers a "0" resistance path. The tunnel device J1 is switched to a finite voltage state following a path given by line L1. If the current IJ1 is lowered such that I in is less than IG1', tunnel device J1 will switch back to its "0" voltage state.

A high density, high speed shift register can be built based upon characteristics of the Josephson devices. More particularly, the shift register circuits depend on the "0" voltage state and the finite voltage state switching ability of the Josephson tunnelling devices. The most important feature of the shift register is that no auxiliary power is necessary to maintain the information in a fixed position within the shift register especially if initial current Iw is removed.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A two-phase shift register using Josephson tunnelling devices comprising:

a plurality of shift register stages;

a current source for providing DC current to each of said shift register stages;

a first and second branch circuit in parallel in each of said shift register states;

a first and second Josephson tunnelling device located in said first and second branch circuits, respectively, said devices operating in their no-voltage state;

a first and second input means for setting the associated Josephson junction to its finite voltage state causing the input current to flow in the opposite branch;

a first and second coupling means located between the first and second branches, respectively, of the stages of said shift register;

a source of phase time pulses, said first and second coupling means between successive stages being energized alternately by a current pulse at the opposite phase times; and said first and second coupling means responding simultaneously to said phase time pulse and to the branch circuit in which the current flows in the preceding stage thereby causing the current to flow in the opposite branch in the succeeding state.

2. A two phase shift using Josephson tunnelling devices according to claim 1, wherein said first and second coupling means each consists of a Josephson device having a bypass circuit connected thereacross through which a current pulse passes when the Josephson device is switched to its finite voltage state.

3. A two phase shift register using Josephson tunnelling devices according to claim 1, wherein said current is applied in series to the successive stages and in parallel to the branches within each stage, said current in the successive stages passing through the branch having a Josephson device in the no-voltage state.

4. A two phase shift register using Josephson tunnelling devices according to claim 1, wherein said first and second branch circuits in parallel constitute superconductive circuits.

5. A two phase shift register using Josephson tunnelling devices according to claim 1, wherein said first and second Josephson tunnelling devices in said first and second branch circuits, respectively, comprise two stripline conductors separated by an insulator barrier so that tunnelling takes place through said barrier to give a zero voltage current up to a critical current value beyond which the device switches into a finite voltage state.

6. A two phase shift register using Josephson tunnelling devices according to claim 2, wherein said first and second coupling means each further include a bypass circuit connected across said Josephson tunneling device and having a terminating resistance therein, said bypass circuit forming the input to the Josephson device of said branch circuit associated therewith in the next stage.

7. A two phase shift register using Josephson tunnelling devices according to claim 6, wherein the first and second coupling means bypass circuit produces a magnetic field when the current flows therethrough which lowers the critical current value of the associated Josephson tunnelling device in the next stage causing it to switch to its finite voltage state thereby causing the current to switch to the other branch of said next stage.

*8. A shift register using Josephson tunnelling devices comprising:*

*a plurality of shift register stages;*

*a current source for providing DC current to each of said shift register stages;*

*a first and second branch circuit in parallel in each of said shift register stages;*

*a first and second Josephson tunnelling device located in said first and second branch circuits, respectively;*

*control means associated with each of said first and second Josephson devices in each stage for selectively setting one of said devices to its finite voltage state causing said DC current to flow through the non-selected Josephson device in the other branch of said stage;*

*at least one phasing means coupled to each of said first and second Josephson tunnelling devices in each stage for sequentially timing the applications of said control means to successive shift register stages for shifting information stored in one stage of said shift register to a succeeding stage.*

*9. A shift register using Josephson tunnelling devices according to claim 8, wherein said control means associated with each of said first and second Josephson devices in each stage subsequent to the first stage includes a section of said first and second branch circuit of the previous stage as control inputs, respectively.*

*10. A shift register using Josephson tunnelling devices according to claim 9, wherein said phasing means includes a timing control input which when energized by a phase timing pulse from a phase timing source simultaneously with the current flowing in said associated control input causes the controlled Josephson device to switch to its finite voltage state, thereby causing transfer of the gating current to the other branch of said stage.*

*11. A shift register using Josephson tunnelling devices according to claim 9, wherein said section of said branch circuit of each stage serves as the control input to the opposite branch of the next stage so that the same gating current flow condition is transferred from stage to stage.*

* * * * *